United States Patent
Ding et al.

(10) Patent No.: US 9,667,691 B2
(45) Date of Patent: May 30, 2017

(54) METHOD FOR RETRIEVING SERVICE CAPABILITY OF A GROUP OF CONTACTS

(71) Applicant: Futurewei Technologies, Inc., Plano, TX (US)

(72) Inventors: Xinmin Ding, San Jose, CA (US); Yilin Gan, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 237 days.

(21) Appl. No.: 14/549,341

(22) Filed: Nov. 20, 2014

(65) Prior Publication Data
US 2016/0149986 A1 May 26, 2016

(51) Int. Cl.
| | |
|---|---|
| G06F 15/16 | (2006.01) |
| H04L 29/08 | (2006.01) |
| H04W 72/04 | (2009.01) |
| H04W 4/08 | (2009.01) |
| H04L 29/06 | (2006.01) |
| H04W 4/00 | (2009.01) |

(52) U.S. Cl.
CPC .......... *H04L 67/02* (2013.01); *H04L 65/1016* (2013.01); *H04L 65/1063* (2013.01); *H04L 67/18* (2013.01); *H04W 4/08* (2013.01); *H04W 72/04* (2013.01); *H04W 4/001* (2013.01)

(58) Field of Classification Search
CPC ..... H04L 41/12; H04L 67/02; H04L 65/1016; H04L 65/1063
USPC ........................................................ 709/217
See application file for complete search history.

(56) References Cited

U.S. PATENT DOCUMENTS

| | | | |
|---|---|---|---|
| 2007/0162564 A1* | 7/2007 | Williams | H04L 67/02 709/219 |
| 2007/0162588 A1* | 7/2007 | Wu | H04W 4/08 709/223 |
| 2008/0045192 A1* | 2/2008 | Zhao | H04L 63/104 455/414.2 |
| 2010/0245262 A1* | 9/2010 | Vance | G06Q 10/107 345/173 |
| 2011/0055735 A1* | 3/2011 | Wood | G06Q 10/107 715/758 |
| 2012/0143938 A1* | 6/2012 | du Preez | G06F 8/65 709/201 |

(Continued)

FOREIGN PATENT DOCUMENTS

| | | |
|---|---|---|
| CN | 102413122 A | 4/2012 |
| CN | 103391313 A | 11/2013 |

OTHER PUBLICATIONS

Partial English Translation and Abstract of Chinese Patent Application No. CN102413122, Jun. 30, 2016, 6 pages.

(Continued)

*Primary Examiner* — Imad Hussain
(74) *Attorney, Agent, or Firm* — Conley Rose, P.C.

(57) ABSTRACT

A method of retrieving service capability in bulk is provided. The method includes a client sending a request to create a group of contacts whose service capability is desired to an application server. The application server sends a response to the client indicating that the group of contacts has been created. The client then sends a request to retrieve the service capability of each of the contacts within the group to the application server. The application server sends a response identifying the service capability of each of the contacts within the group to the client.

20 Claims, 4 Drawing Sheets

(56) References Cited

U.S. PATENT DOCUMENTS

| | | | | |
|---|---|---|---|---|
| 2012/0260330 A1* | 10/2012 | Zlatarev | ............... | G06F 21/33 726/10 |
| 2013/0041995 A1* | 2/2013 | Yao | ..................... | H04L 41/50 709/223 |
| 2014/0057667 A1* | 2/2014 | Blankenship | ......... | H04L 67/303 455/500 |
| 2014/0372557 A1* | 12/2014 | Buckley | ............ | H04L 67/104 709/217 |
| 2015/0271318 A1* | 9/2015 | Antos | ............ | H04M 1/72583 455/412.1 |

OTHER PUBLICATIONS

Partial English Translation and Abstract of Chinese Patent Application No. CN103391313, Jun. 30, 2016, 14 pages.

Foreign Communication From a Counterpart Application, PCT Application No. PCT/CN2015/094807, International Search Report dated Feb. 18, 2016, 3 pages.

Fielding, Ed., et al., "Hypertext Transfer Protocol (HTTP/1.1): Semantics and Content," draft-ietf-httpis-p2-semantics-26.txt, Feb. 6, 2014, 101 pages.

Rosenbert, et al., "SIP: Session Initiation Protocol," draft-ietf-sip-rfc2543bis-08.ps, Feb. 21, 2002, 194 pages.

"Enabler Release Definition for RESTful Network API for Capability Discovery, Candidate Version 1.0—Jul. 1, 2013," Open Mobile Alliance OMA-ERELD-REST_NetAPI_CapabilityDiscovery-V1_0-20130701-C, 2013, 12 pages.

"Restful Network API for Capability Discovery, Candidate Version 1.0—Jul. 1, 2013," Open Mobile Alliance OMA-TS-REST_NetAPI_CapabilityDiscovery-V1_0-20130701-C, 2013, 66 pages.

Rosenberg, et al, "SIP: Session Initiation Protocol," RFC 3261, Jun. 2002, 269 pages.

Fielding, Ed., et al., "Hypertext Transfer Protocol (HTTP/1.1): Semantics and Content," RFC 7231, Jun. 2014, 101 pages.

* cited by examiner

METHOD FOR RETRIEVING SERVICE CAPABILITY OF A GROUP OF CONTACTS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Representational state transfer (REST) is an abstraction of the architecture of the World Wide Web. More precisely, REST is an architectural style including a coordinated set of architectural constraints applied to components, connectors, and data elements within a distributed hypermedia system. REST ignores the details of component implementation and protocol syntax in order to focus on the roles of components, the constraints upon their interaction with other components, and their interpretation of significant data elements.

The REST architectural style may be applied to the development of web services as an alternative to other distributed-computing specifications such as, for example, Simple Object Access protocol (SOAP). One can characterize web services as "RESTful" if they conform to certain architectural constraints involving or relating to a client-server model, a stateless protocol, a web cache, a layered system, code on demand (optional), and a uniform interface.

In some circumstances, the REST architectural style may be applied to web application programming interfaces (APIs). Web APIs that adhere to the architectural constraints are called RESTful.

SUMMARY

In one embodiment, the disclosure includes a method of retrieving service capability in bulk. The method includes receiving, from a representational state transfer (REST) client, a request to create a group of contacts whose service capability is desired, sending, to the REST client, a response indicating that the group of contacts has been created, receiving, from the REST client, a request to retrieve the service capability of each of the contacts within the group, and sending, to the REST client, a response identifying the service capability of each of the contacts within the group.

In another embodiment, the disclosure includes a method of retrieving service capability in bulk. The method includes sending, to an application server, a request to create a group of contacts whose service capability is desired, receiving, from the application server, a response indicating that the group of contacts has been created, sending, to the application server, a request to retrieve the service capability of each of the contacts within the group, and receiving, from the application server, a response identifying the service capability of each of the contacts within the group.

In yet another embodiment, the disclosure includes an application server. The application server includes a processor operably coupled to a memory, and a bulk service capability module stored in the memory that, when executed by the processor, is configured to receive, from a REST client, a request to create a group of contacts whose service capability is desired, create the group of contacts based on the request, send, to the REST client, a response indicating that the group of contacts has been created, receive, from the REST client, a request to retrieve the service capability of each of the contacts within the group, retrieve, from a contact application server corresponding to each of the contacts, the service capability of the contacts within the group, and send, to the REST client, a response identifying the service capability of each of the contacts within the group.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for retrieving service capability in bulk in a representational state transfer (REST) system. As will be more fully explained below, the system and methods disclosed herein permit a RESTful client to determine the service capabilities of a group of contacts in a single process. In other words, the RESTful client is able to retrieve the service capabilities of several contacts simultaneously. As such, the RESTful client does not have to obtain the service capability of numerous contacts one at a time (e.g., one-by-one). Because one bulk service capability request is used for numerous contacts, network resources are more efficiently utilized.

Figure 1:
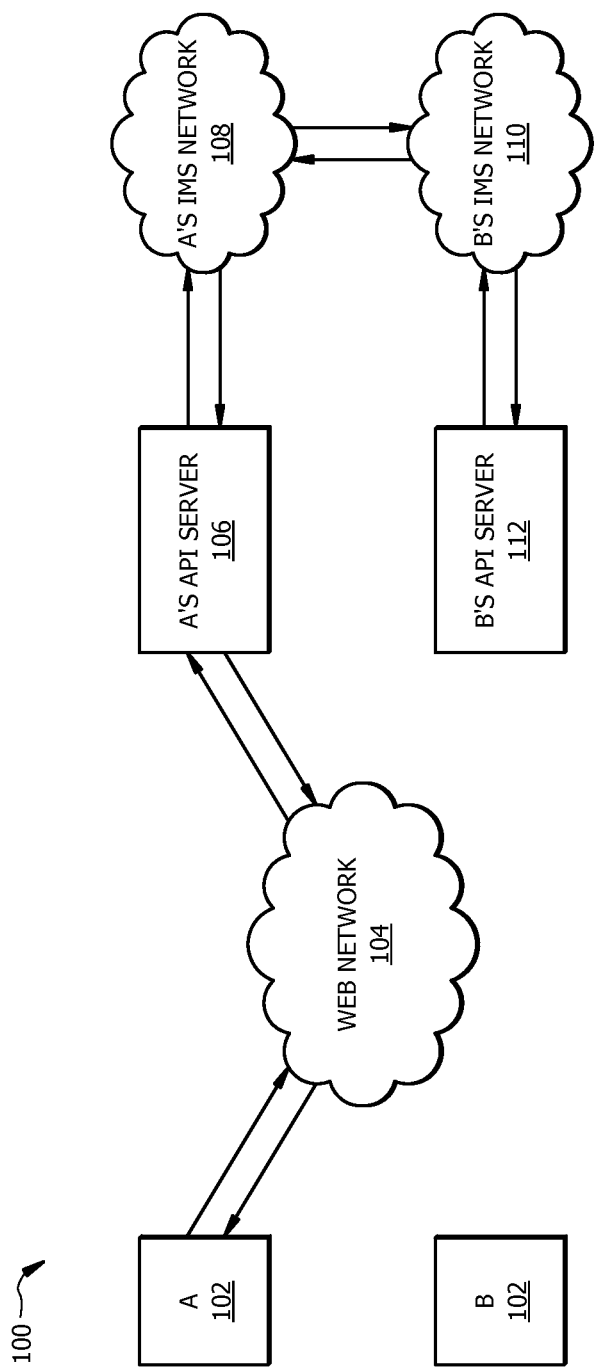
FIG. 1 is a schematic diagram of a client discovering the capability of a contact in a representational state transfer (REST) system.

FIG. 1 is a schematic diagram of a client 102 (e.g., client A) discovering the capability of a contact 102 (e.g., target client B) in a REST system 100. The REST architecture and application programming interface (API) are described in more detail in the RESTful Network API for Capability Discovery, Candidate Version 1.0, specification published Jul. 1, 2013, and the Enabler Release Definition for RESTful Network API for Capability Discovery, Candidate Version 1.0, specification published Jul. 1, 2013, both of which are incorporated herein by reference as if reproduced in their entirety.

As shown in FIG. 1, the REST system 100 includes one or more computing devices, which for convenience will be referred to herein as clients 102. In some embodiments, one or both of the clients 102 is a personal computer (PC), a mobile device (e.g., smart phone, tablet computer, etc.). In some embodiments, each client 102 includes one or more APIs used to handle a web application. By way of example, the web application is a web application used to make video calls (e.g., Microsoft Skype™) or to otherwise facilitate communication between the clients 102.

Each client 102 includes a browser (e.g., Mozilla Firefox®, Google Chrome®, Microsoft Internet Explorer®, or Apple Safari®). As well known in the art, a browser is a software application for retrieving, presenting, and traversing information resources on the World Wide Web. Some web browsers utilize a technology referred to a Web Real-Time Communications (WebRTC). WebRTC is an API drafted by the Worldwide Web Consortium (W3C) that supports browser-to-browser application for video-calling, video chat, peer-to-peer (P2P) file sharing, and the like, without requiring a plugin in the browser. If the browser of each client 102 includes support for WebRTC, the clients 102 are able to engage in browser-to-browser communications without the need for a plugin.

As shown in FIG. 1, one of the clients 102 is labeled client A and another of the clients is labeled client B. When client A, which may or may not be RESTful, wants to determine the service capability of client B (e.g., a contact of client A), which may or may not be RESTful, client A sends a service capability request message through web network 104 to A's API server 106. A's API server 106 is, for example, a WebRTC user network interface (UNI) server. In some embodiments, the service capability request message sent by client A is in a Hypertext Transfer Protocol (HTTP) format. A's API server 106 is configured to convert the service capability request message into a session initiation protocol (SIP) format.

A's API server 106 sends the service capability request message to A's Internet Protocol (IP) multimedia system (IMS) network 108. In some cases, the service capability request message sent to A's IMS network 108 is a standard SIP OPTIONS request. The OPTIONS request is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety.

If client A and client B have different carriers (e.g., AT&T®, Verizon®, T-Mobile®, etc.), client B will have its own Internet Protocol (IP) multimedia system (IMS) network 110. In such circumstances, A's IMS network 108 sends the service capability request message to B's IMS network 110. B's IMS network 110 then sends the service capability message to B's API server 112, which knows or can determine the service capability of client B. B's API server 112 is, for example, a WebRTC user network interface (UNI) server. B's API server 112 responds to the service capability request message by sending a service capability response message, which contains an indication of client B's capabilities, to B's IMS network 110. B's IMS network 110 sends the service capability response message to A's IMS network 108, which then sends the service capability response message to A's API server 106. A's API server 106 is configured to convert the message from the SIP format to the HTTP format.

A's API server 106 sends the service capability response message through the web network 104 to client A. Client A is then able to extract or determine B's capabilities from the service capability response message.

Figure 2:
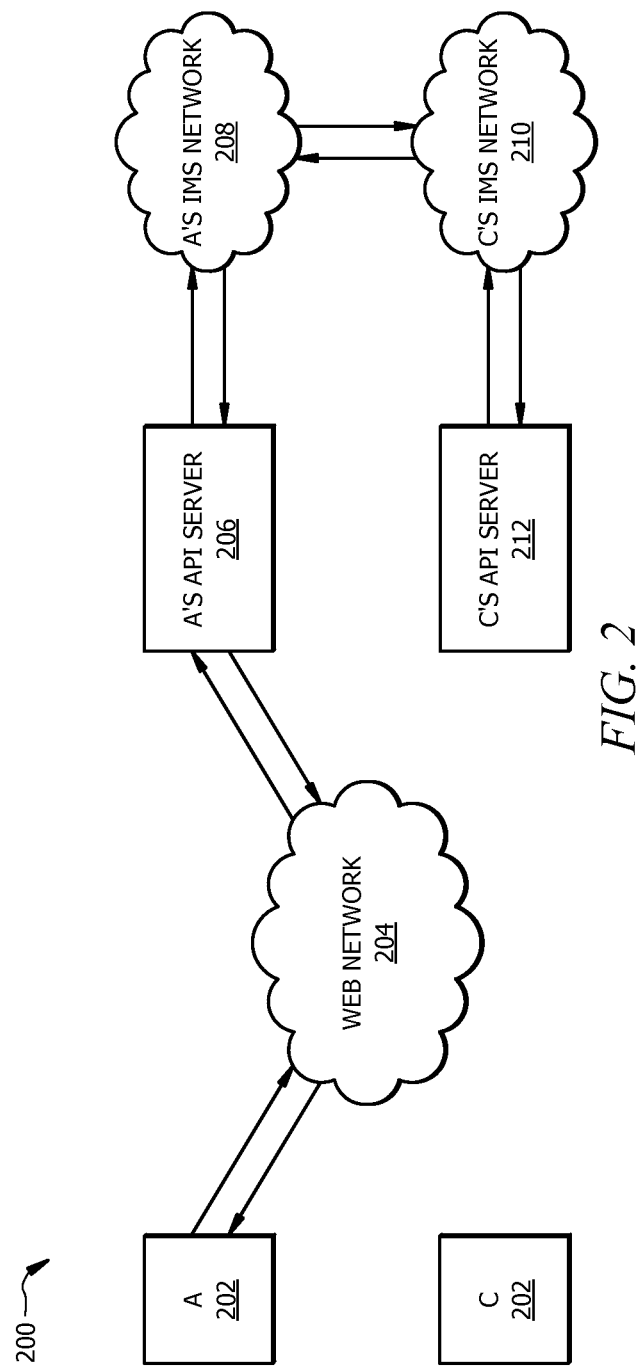
FIG. 2 is a schematic diagram of a client discovering the capability of another contact in a REST system.

FIG. 2 is a schematic diagram of a client 202 (e.g., client A) discovering the capability of another contact 102 (e.g., target client C) in a REST system 200. The REST system 200 includes one or more computing devices, which are referred to clients 202. In some embodiments, the clients 202 are configured similar to clients 102 in FIG. 1. As shown in FIG. 2, one of the clients 102 is labeled client A and another of the clients is labeled client C. The clients 202, the web network 204, A's API server 206, A's IMS network 208, C's IMS network 210, and C's API server 212 in FIG. 2 may be configured similar to the clients 102, the web network 104, A's API server 106, A's IMS network 108, B's IMS network 110, and B's API server 112 in FIG. 1.

When client A, which may or may not be RESTful, wants to determine the service capability of client C (e.g., (e.g., a contact of client A), which may or may not be RESTful, client A sends a service capability request message through web network 204 to A's API server 206. A's API server 206 is, for example, a WebRTC user network interface (UNI) server. In some embodiments, the service capability request message sent by client A is in a Hypertext Transfer Protocol (HTTP) format. A's API server 206 is configured to convert the service capability request message into a session initiation protocol (SIP) format.

A's API server 206 sends the service capability request message to A's Internet Protocol (IP) multimedia system (IMS) network 208. In some cases, the service capability request message sent to A's IMS network 208 is a standard SIP OPTIONS request.

If client A and client C have different carriers (e.g., AT&T®, Verizon®, T-Mobile®, etc.), client C will have its own IMS network 210. In such circumstances, A's IMS network 208 sends the service capability request message to C's IMS network 210. C's IMS network 210 then sends the service capability message to C's API server 212, which knows or can determine the service capability of client C. C's API server 212 is, for example, a WebRTC UNI server. C's API server 212 responds to the service capability request message by sending a service capability response message, which contains an indication of client C's capabilities, to C's IMS network 210. C's IMS network 210 sends the service capability response message to A's IMS network 208, which then sends the service capability response message to A's API server 206. A's API server 206 is configured to convert the message from the SIP format to the HTTP format.

A's API server 206 sends the service capability response message through the web network 204 to client A. Client A is then able to extract or determine C's capabilities from the service capability response message.

Unfortunately, the service capability discovery process in FIG. 1 or FIG. 2 needs to be carried out separately to determine the service capability for each target client. For example, if client A wants to know the service capability of five different target clients, namely target client B, target client C, target client D, target client E, and target client F, the service capability discovery process of FIG. 1 or FIG. 2 has to be repeated five times. This is a waste of network resources. Moreover, because the service discovery process is performed separately for each target client, the overall capability discovery process is inefficient.

Figure 3:
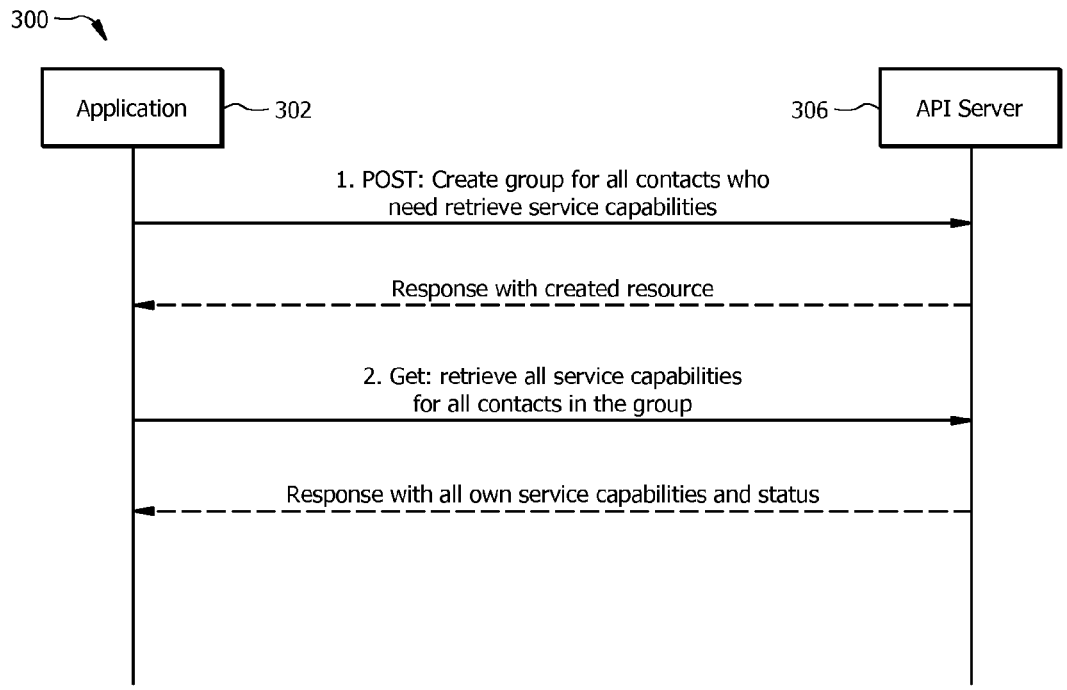
FIG. 3 is a protocol diagram of an embodiment of a bulk service capability method.

FIG. 3 is a protocol diagram of an embodiment of a bulk service capability method 300 that solves the foregoing problems. The method 300 is implemented using a client 302 (e.g., running an application) and an API server 306. In some embodiments, the client 302 and API server 306 are configured similar to the client 102, 202 and A's API server 106, 206 in FIGS. 1-2.

When the client 302, which may or may not be RESTful, wants to determine the service capability of a group of contacts (e.g., client B and client C in FIGS. 1-2), the client 302 sends a request to create a group of contacts to the API server 306. As used herein, the service capability refers to, for example, an ability to chat, video chat, call, video call, engage in file transfer, and so on.

In some embodiments, the group of contacts corresponds to all of the contacts stored by the client 302. In some embodiments, the group of contacts includes all of the contacts in a phone book of the client 302. In addition, the group of contacts may be some subset of the contacts stored by, or in the phone book of, the client 302.

In some embodiments, the group of contacts is based on a current use of a same application (e.g., Facebook®, Twitter®, FaceTime®, etc.) by the contacts and the client 302. For example, the group of contacts and the client may all be currently running or using the same application on a mobile device. In some embodiments, the group of contacts is based on a common geographic area of the contacts and the client 302. For example, the client 302 and the contacts are all within the same city, at the same arena for a sporting event, within range of the same cellular network or wireless fidelity (WiFi) hotspot, and so on. In some embodiments, the group of contacts is based on a proximity of the contacts to the client 302. For example, the client 302 and the contacts are within a certain distance from each other (e.g., ten miles). In some embodiments, the group of contacts is based on a common membership of the contacts and the client. For example, the contacts and the client 302 may all be members of the same family, own the same type of mobile phone, and so on. Those skilled in the art will appreciate that the group of contacts may be determined or defined in a variety of different ways upon viewing this disclosure.

In some embodiments, the request to create the group of contacts whose service capability is desired is performed using HTTP operations or verbs. For example, the request to create the group of contacts sent by the client 302 to the API server 306 is implemented using the HTTP operation POST. The POST function is described in more detail in the Internet Engineering Task Force (IETF) document Hypertext Transfer Protocol (HTTP/1.1): Semantics and Content, draft-ietf-httpbis-p2-semantics-26, published Feb. 6, 2014, and the Request for Comments (RFC) document, Hypertext Transfer Protocol (HTTP/1.1): Semantics and Content, RFC 7231, published June 2014, both of which are incorporated herein by reference as if reproduced in their entirety.

After the request to create the group of contacts is received, the API server 306 creates the group of contacts. The API server 306 then sends a response indicating that the group of contacts has been created to the client 302. Thereafter, the API server 308 receives a request to retrieve the service capability of each of the contacts within the group from the client 302. In some embodiments, the request to retrieve the service capability of each of the contacts within the group is performed using HTTP operations or verbs. For example, the request to retrieve the service capability of each of the contacts within the group sent by the client 302 to the API server 306 is implemented using the HTTP operation GET. The GET function is described in more detail in the Internet Engineering Task Force (IETF) document Hypertext Transfer Protocol (HTTP/1.1): Semantics and Content, draft-ietf-httpbis-p2-semantics-26, published Feb. 6, 2014, and the Request for Comments (RFC) document, Hypertext Transfer Protocol (HTTP/1.1): Semantics and Content, RFC 7231, published June 2014, both of which are incorporated herein by reference as if reproduced in their entirety.

After the request to retrieve the service capability of each of the contacts within the group is received, the API server 306 obtains or attempts to obtain the service capability of each of the contacts in the group. By way of example, the API server 306 may query the API server corresponding to each of the contacts and request the service capability information. If the contacts in the groups use different carriers, different IMS networks (as described above) may be involved when the service capability of the contacts is obtained.

If, for some reason, the API server 306 does not receive the service capability of each of the contacts in the group from their corresponding API servers, the API server 306 may use a default service capability for each of the contacts with an old (e.g., stale) or unknown service capability. For example, the API server 306 presumes that a contact within the group basic calling and texting capabilities, but not video chat, video calling, or file transfer capabilities, when the API server for that particular contact failed to respond to the service capability request.

Once the service capability of each of the contacts in the group has been obtained or assigned by default, the API server 306 sends a response identifying the service capability of each of the contacts within the group to the client 302. In some embodiments, the response is sent by the API server 306 to the client 302 in a single transmission or message. As such, the application receives one message containing the service capability of each of the contacts in the group at one time instead of a separate message for each contact at different times.

Figure 4:
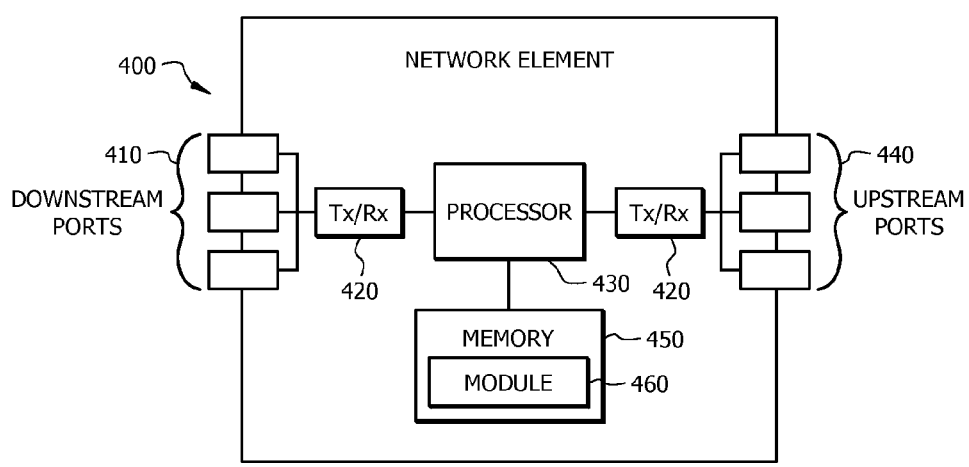
FIG. 4 is a schematic diagram of an embodiment of a computing device capable of facilitating the bulk service capability retrieval in the protocol diagram of FIG. 3.

FIG. 4 is a schematic diagram of an embodiment of a server 400 used to send and receive messages or information through at least a portion of the REST systems 100-300 shown in FIGS. 1-3. At least some of the features/methods described in the disclosure are implemented in the server 400. For instance, the features/methods of the disclosure are implemented in hardware, firmware, and/or software installed to run on the hardware. The server 400 is any device that transports data through a network, system, and/or domain. Moreover, the terms server, computer, logic device, and/or similar terms are interchangeably used to generally describe a server and do not have a particular or special meaning unless otherwise specifically stated and/or claimed within the disclosure.

In one embodiment, the server 400 is an apparatus configured to participate in the bulk service capability discovery process depicted in FIG. 3. In addition, components or functions of the server 400 are implemented in and/or integrated within the clients 302 or the API server 306 as described and illustrated in FIG. 3.

The server 400 comprises one or more downstream ports 410 coupled to a transceiver (Tx/Rx) 420, which are transmitters, receivers, or combinations thereof. The Tx/Rx 420 transmits and/or receives messages or information from other network devices (e.g., servers, etc.) via the downstream ports 410. Similarly, the server 400 comprises another Tx/Rx 420 coupled to a plurality of upstream ports 440, wherein the Tx/Rx 420 transmits and/or receives messages or information from other network devices via the upstream ports 440. The downstream ports 410 and/or the upstream ports 420 include electrical and/or optical transmitting and/or receiving components.

A processor 430 is coupled to the Tx/Rx 420 and is configured to process the messages or information and/or determine which servers to send (e.g., transmit) the messages or information to. In an embodiment, the processor 430 comprises one or more multi-core processors and/or memory modules 450, which function as data stores, buffers, etc. In some embodiments, the processor 430 is implemented as a general processor or as a part of one or more application specific integrated circuits (ASICs), field-programmable gate arrays (FPGAs), and/or digital signal processors (DSPs). Although illustrated as a single processor, the processor 430 is not so limited and may be multiple processors. The processor 430 is configured to the adaptive and dynamic allocation of media resources described herein.

FIG. 4 illustrates that a memory 450 is coupled to the processor 430 and is a non-transitory medium configured to store various types of data. In some embodiments, memory 450 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory 450 is used to house the instructions for carrying out the various example embodiments described herein. In one example embodiment, the memory 450 comprises a module 460. In an embodiment, the module 460 represents a bulk service capability module disposed within the client 302 and/or the API server 306 as shown in FIG. 3. The bulk service capability module 460 is capable of implementing the bulk service capability process disclosed herein. In other words, the bulk service capability module 460 permits the client 302 and the API server 306 to communicate with each other regarding, for example, the service capability of a group of contacts of the client 302. In some embodiments, the memory 450 stores instructions capable of implementing the bulk service capability method 300 of FIG. 3.

It is understood that by programming and/or loading executable instructions onto the server 400, at least one of the processor 430, the cache, and the long-term storage are changed, transforming the server 400 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 5:
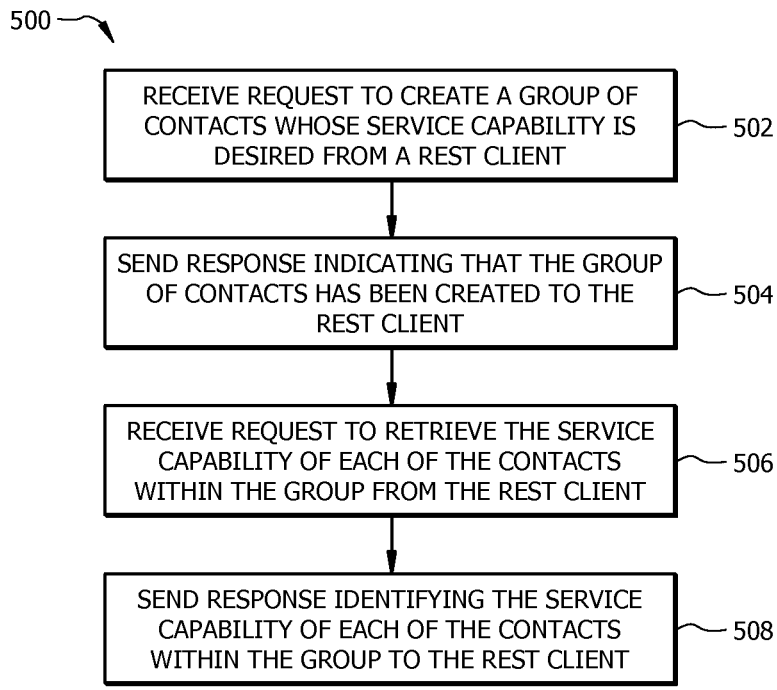
FIG. 5 is a flowchart of an embodiment of a method of retrieving service capability in bulk.

FIG. 5 is a flowchart of an embodiment of a method 500 of retrieving service capability in bulk. The method 500 is implemented when, for example, a REST client desires to determine the service capability of a group of contacts. In an embodiment, the instructions for executing the method 500 are stored in bulk service capability module 460 and the method 500 is implemented using processor 430. In block 502, a request to create a group of contacts whose service capability is desired is received from a REST client. In an embodiment, the service capability refers to, for example, an ability to chat, video chat, call, video call, engage in file transfer, and so on. In some embodiments, the group of contacts corresponds to all of the contacts stored by the REST client. In some embodiments, the group of contacts includes all of the contacts in a phone book of the REST client. In addition, the group of contacts may be some subset of the contacts stored by, or in the phone book of, the REST client. In some embodiments, the group of contacts is based on a current use of a same application (e.g., Facebook®, Twitter®, FaceTime®, etc.) by the contacts and the REST client. For example, the group of contacts and the client may all be currently running or using the same application on a mobile device. In some embodiments, the group of contacts is based on a common geographic area of the contacts and the REST client. For example, the REST client and the contacts are all within the same city, at the same arena for a sporting event, within range of the same cellular network or wireless fidelity (WiFi) hotspot, and so on. In some embodiments, the group of contacts is based on a proximity of the contacts to the REST client. For example, the REST client and the contacts are within a certain distance from each other (e.g., ten miles). In some embodiments, the group of contacts is based on a common membership of the contacts and the REST client. For example, the contacts and the REST client may all be members of the same family, own the same type of mobile phone, and so on. Those skilled in the art will appreciate that the group of contacts may be determined or defined in a variety of different ways upon viewing this disclosure.

In some embodiments, the request to create the group of contacts whose service capability is desired is performed using HTTP operations or verbs. For example, the request to create the group of contacts sent by the REST client to the API server is implemented using the HTTP operation POST.

In block 504, a response indicating that the group of contacts has been created is sent to the REST client. In block 506, a request to retrieve the service capability of each of the contacts within the group is received from the REST client. In an embodiment, the request to retrieve the service capability of each of the contacts within the group sent by the REST client to the API server is implemented using the HTTP operation GET. In block 508, a response identifying the service capability of each of the contacts within the group is sent to the REST client. In some embodiments, the response is sent by the API server to the REST client in a single transmission or message. As such, the application receives one message containing the service capability of each of the contacts in the group at one time instead of a separate message for each contact at different times.

Figure 6:
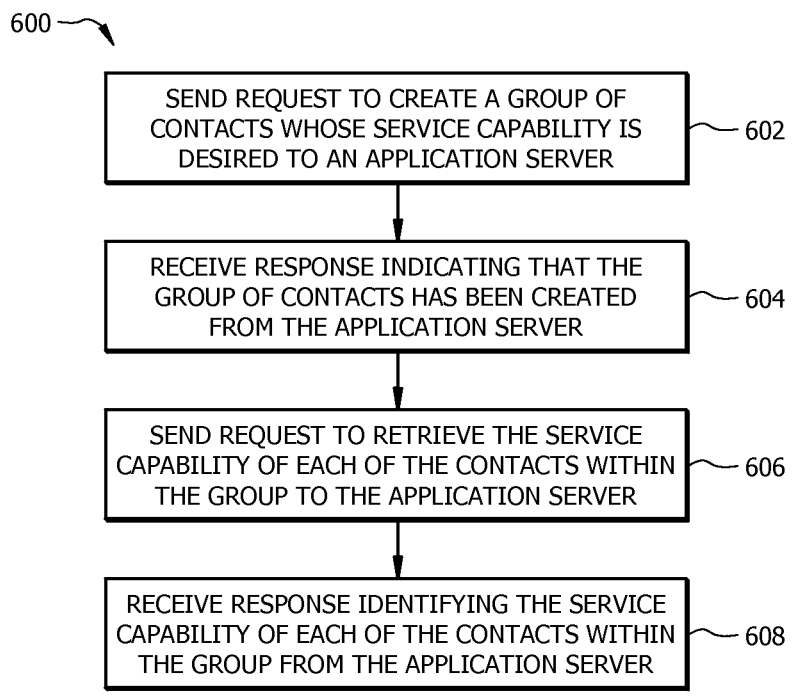
FIG. 6 is a flowchart of an embodiment of a method of retrieving service capability in bulk.

FIG. 6 is a flowchart of an embodiment of a method 600 of retrieving service capability in bulk. In an embodiment, the instructions for executing the method 600 are stored in bulk service capability module 460 and the method 600 is implemented using processor 430. The method 600 is implemented when, for example, a REST client desires to determine the service capability of a group of contacts. In block 602, a request to create a group of contacts whose service capability is desired is sent to an application server. In an embodiment, the service capability refers to, for example, an ability to chat, video chat, call, video call, engage in file transfer, and so on. In some embodiments, the group of contacts corresponds to all of the contacts stored by the REST client. In some embodiments, the group of contacts includes all of the contacts in a phone book of the REST client. In addition, the group of contacts may be some subset of the contacts stored by, or in the phone book of, the REST client. In some embodiments, the group of contacts is based on a current use of a same application (e.g., Facebook®, Twitter®, FaceTime®, etc.) by the contacts and the REST client. For example, the group of contacts and the client may all be currently running or using the same application on a mobile device. In some embodiments, the group of contacts is based on a common geographic area of the contacts and the REST client. For example, the REST client and the contacts are all within the same city, at the same arena for a sporting event, within range of the same cellular network or wireless fidelity (WiFi) hotspot, and so on. In some embodiments, the group of contacts is based on a proximity of the contacts to the REST client. For example, the REST client and the contacts are within a certain distance from each other (e.g., ten miles). In some embodiments, the group of contacts is based on a common membership of the contacts and the REST client. For example, the contacts and the REST client may all be members of the same family, own the same type of mobile phone, and so on. Those skilled in the art will appreciate that the group of contacts may be determined or defined in a variety of different ways upon viewing this disclosure.

In some embodiments, the request to create the group of contacts whose service capability is desired is performed using HTTP operations or verbs. For example, the request to create the group of contacts sent by the REST client to the API server is implemented using the HTTP operation POST.

In block 604, a response indicating that the group of contacts has been created is received from the application server. In block 606, a request to retrieve the service capability of each of the contacts within the group is sent to the application server. In an embodiment, the request to retrieve the service capability of each of the contacts within the group sent by the REST client to the API server is implemented using the HTTP operation GET. In block 608, a response identifying the service capability of each of the contacts within the group is received from the application server. In some embodiments, the response is sent by the API server to the REST client in a single transmission or message. As such, the application receives one message containing the service capability of each of the contacts in the group at one time instead of a separate message for each contact at different times.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method of retrieving service capability in bulk, comprising:
   receiving, from a representational state transfer (REST) client, a request to create a group of contacts whose service capability is desired;
   sending, to the REST client, a response indicating that the group of contacts has been created;
   receiving, from the REST client, a request to retrieve the service capability of each of the contacts within the group; and
   sending, to the REST client, a response identifying the service capability of each of the contacts within the group, wherein the response includes a default service capability for each of the contacts within the group whose service capability was not able to be retrieved.

2. The method of claim 1, wherein the group of contacts corresponds to all contacts stored by the REST client.

3. The method of claim 1, wherein the group of contacts includes all contacts in a phone book of the REST client.

4. The method of claim 1, wherein the group of contacts is based on a current use of a same application by the contacts and the REST client.

5. The method of claim 1, wherein the group of contacts is based on one of a common geographic area of the contacts and the REST client and a proximity of the contacts to the REST client.

6. The method of claim 1, wherein the group of contacts is based on a common membership of the contacts and the REST client.

7. The method of claim 1, wherein the service capability is one of a chat capability and a file transfer capability.

8. The method of claim 1, wherein the request to create the group of contacts comprises a Hypertext Protocol (HTTP) POST message.

9. The method of claim 1, wherein the request to retrieve the service capability of each of the contacts within the group of contacts comprises a Hypertext Protocol (HTTP) GET message.

10. The method of claim 1, wherein each of the contacts is a mobile phone.

11. The method of claim 1, wherein one or more of the contacts is a mobile phone.

12. The method of claim 1, further comprising creating the group of contacts based on the request and retrieving, from a contact application server corresponding to each of the contacts, the service capability of the contacts within the group.

13. The method of claim 1, further comprising retrieving the service capability of less than all of the contacts within the group.

14. A method of retrieving service capability in bulk, comprising:
    sending, to an application server, a request to create a group of contacts whose service capability is desired;
    receiving, from the application server, a response indicating that the group of contacts has been created;
    sending, to the application server, a request to retrieve the service capability of each of the contacts within the group; and
    receiving, from the application server, a response identifying the service capability of each of the contacts within the group, wherein the response includes a default service capability for each of the contacts within the group whose service capability was not able to be retrieved.

15. The method of claim 14, wherein the group of contacts corresponds to all contacts stored by a representational state transfer (REST) client.

16. The method of claim 14, wherein the group of contacts includes all contacts in a phone book of a representational state transfer (REST) client.

17. The method of claim 14, wherein the service capability is one of a chat capability and a file transfer capability, and wherein one or more of the contacts is a mobile phone.

18. An application server, comprising:
    a processor operably coupled to a memory, and
    a bulk service capability module stored in the memory that, when executed by the processor, is configured to:
        receive, from a representational state transfer (REST) client, a request to create a group of contacts whose service capability is desired;
        create the group of contacts based on the request;
        send, to the REST client, a response indicating that the group of contacts has been created;
        receive, from the REST client, a request to retrieve the service capability of each of the contacts within the group;
        retrieve, from a contact application server corresponding to each of the contacts, the service capability of the contacts within the group; and
        send, to the REST client, a response identifying the service capability of each of the contacts within the group, wherein the response includes a default service capability for each of the contacts within the group whose service capability was not able to be retrieved.

19. The application server of claim 18, wherein the group of contacts corresponds to the contacts saved in a phone book of the REST client, and wherein the service capability is one of a chat capability and a file transfer capability.

20. The application server of claim 18, wherein one or more of the contacts is a mobile phone.

* * * * *